United States Patent [19]
Lonn et al.

[11] Patent Number: 5,394,678
[45] Date of Patent: Mar. 7, 1995

[54] ELECTRONIC CONTROL FOR TURF MAINTENANCE VEHICLE

[75] Inventors: Dana R. Lonn, Minneapolis; Fredrick D. Wucherpfennig, Bloomington; William M. Dunford, Minneapolis, all of Minn.

[73] Assignee: The Toro Company, Minneapolis, Minn.

[21] Appl. No.: 249,098

[22] Filed: May 23, 1994

Related U.S. Application Data

[63] Continuation of Ser. No. 816,816, Jan. 3, 1992, abandoned.

[51] Int. Cl.$^6$ .................................. A01D 34/44
[52] U.S. Cl. ........................... 56/10.2 H; 56/7; 56/294; 56/DIG. 2
[58] Field of Search .............. 56/10.2 G, 10.2 H, 7, 56/17.1, 249, 294, DIG. 2, DIG. 3, DIG. 10, DIG. 20

[56] References Cited

U.S. PATENT DOCUMENTS

| | | | |
|---|---|---|---|
| 1,944,584 | 1/1934 | Stegeman et al. | 56/7 |
| 2,513,309 | 7/1950 | Grobowski et al. | 56/249 |
| 2,523,014 | 9/1950 | Gooch | 56/25.4 |
| 2,588,002 | 3/1952 | Holmes | 56/25 |
| 2,869,309 | 1/1959 | Benson | 56/249 |
| 3,093,946 | 6/1963 | Pitt et al. | 56/20 |
| 3,098,574 | 7/1963 | De Marco | 214/674 |
| 3,177,638 | 4/1965 | Johnson | 56/7 |
| 3,207,244 | 9/1965 | Becker et al. | 130/6.48 |
| 3,401,764 | 9/1968 | Schafer | 180/66 |
| 3,410,063 | 11/1968 | Speiser | 56/7 |
| 3,429,110 | 2/1969 | Strasel | 56/7 |
| 3,442,068 | 5/1969 | Bulin | 56/20 |
| 3,442,070 | 5/1969 | Batog | 56/21 |
| 3,514,929 | 6/1970 | Cornish et al. | 56/21 |
| 3,589,109 | 6/1971 | Payne | 56/10.2 |
| 3,742,685 | 7/1973 | Lian et al. | 56/7 |
| 3,758,967 | 9/1973 | Thompson | 56/16.7 X |
| 3,816,985 | 6/1974 | Sorenson | 56/7 |
| 3,854,271 | 12/1974 | Aldred | 56/7 |
| 3,968,630 | 7/1976 | Mitchell | 56/7 |
| 3,973,379 | 8/1976 | Ecker et al. | 56/7 X |
| 3,999,359 | 12/1976 | Jordan et al. | 56/27.5 |
| 4,188,772 | 2/1980 | Jordan et al. | 56/10.2 |
| 4,192,124 | 3/1980 | Balthes | 56/27.5 |

(List continued on next page.)

FOREIGN PATENT DOCUMENTS

| | | |
|---|---|---|
| 2075684 | 10/1971 | France . |
| 2178669 | 11/1973 | France . |
| 424031 | 2/1935 | United Kingdom . |
| 1375827 | 11/1974 | United Kingdom . |
| 0377163 | 7/1990 | WIPO . |

OTHER PUBLICATIONS

Reelmaster® 223-D Operator's Manual (1991).
Reelmaster® 223-D Brochure (1990).

Primary Examiner—Terry Lee Melius
Attorney, Agent, or Firm—Merchant, Gould, Smith, Edell, Welter & Schmidt

[57] ABSTRACT

The present invention provides for an automated clip control device for maintaining a predetermined clip at varying ground speeds, heights of cut, and other changed conditions. The reel speed of the mower 10 is controlled based upon a feed-back control loop, using as input the ground speed of the mower 10, the actual speed of the reel 48, 50, and 52, the number of blades on the reel, and height of cut, among other factors. A microprocessor 102 uses control process equations to determine the duration of an output pulse width modulated signal which is provided to a valve 702, 706 controlling hydraulic fluid flow to the reel motor 71–75. The target value of the reel speed is determined by reading the desired height of cut value and the number of blades per reel, and then going to a look-up table which contains optimized "linear distance traveled per time grass is cut" values. Once the appropriate look-up table target value is found, the target reel speed is determined by finding the product of the number of blades on the reel times the target clip times the ground speed times a constant (to correct for units).

30 Claims, 11 Drawing Sheets

U.S. PATENT DOCUMENTS

| | | | |
|---|---|---|---|
| 4,296,409 | 10/1981 | Whitaker et al. | 340/684 |
| 4,327,544 | 5/1982 | McDuffie et al. | 56/10.2 |
| 4,332,127 | 6/1982 | Staiert et al. | 56/10.2 |
| 4,376,298 | 3/1983 | Sokol et al. | 364/551 |
| 4,430,846 | 2/1984 | Presley et al. | 56/10.2 |
| 4,487,002 | 12/1984 | Kruse et al. | 56/10.2 |
| 4,527,241 | 7/1985 | Sheehan et al. | 364/424 |
| 4,551,801 | 11/1985 | Sokol | 364/424 |
| 4,616,328 | 10/1986 | Kassay et al. | 364/551 |
| 4,710,757 | 12/1987 | Haase | 340/684 |
| 4,878,338 | 11/1989 | Aldred et al. | 56/7 |
| 4,967,544 | 11/1990 | Ziegler et al. | 56/10.2 |
| 5,042,236 | 8/1991 | Lamusga et al. | 56/7 |
| 5,195,612 | 3/1993 | Hahn et al. | 184/6.4 |

ELECTRONIC CONTROL FOR TURF MAINTENANCE VEHICLE

This is a continuation of application Ser. No. 07/816,816, filed Jan. 3, 1992, which was abandoned upon the filing hereof.

FIELD OF THE INVENTION

The present invention relates generally to turf maintenance, and more particularly to an automated controller which includes as one feature adjusting reel speed relative to ground speed to optimize the clip.

BACKGROUND ART

Commercial riding lawn mowers of the type used on golf courses, athletic fields and the like, are relatively large machines which often utilize cutting reels as opposed to rotary blades. Typically on such mowers two or three cutting reels are provided across the front of the mower. Additionally, one or more cutting reels are positioned in trailing relationship behind the gaps between the front cutting reels. The cutting reels make direct contact with the grass when cutting, following the contour and undulations of the terrain as the mower moves over the ground. The Toro Company, which is the assignee hereof, manufactures and sells several examples of such mowers.

Although the present invention relates to turf maintenance vehicles usable in a large variety of situations (including but not limited to cutting grass in parks, athletic fields, golf courses, etc.), the maintenance of golf courses will be utilized herein for the purposes of illustration. Now continuing with the golf course example, it will be immediately appreciated that cutting grass on a golf course is a recurring and time consuming task. Further, the particular tee or fairway is typically taken out of service while the cutting is occurring. Accordingly, it is desirable to drive the mower as fast as possible while maintaining the desired cutting height and quality of cut, since the ground speed of the mower while cutting is directly related to the time necessary to cut the particular tee or fairway. However, in such settings the potential ground speed depends upon the ability of the cutting reels to maintain the desired quality of cut. Those skilled in the art will appreciate that the potential ground speed is also affected by variations in the terrain, the experience of the operator, and the turf conditions. Still other considerations include the type of grass, the moisture on the grass and/or the moisture content of the grass, and the desired cutting height of the grass.

In determining whether the cutting reels are maintaining the desired quality of cut, two broad categories may be considered. The first category is whether the cut is "clean." A clean cut may be defined as the absence of straggler or uncut blades of grass after the reel passes over the turf. A cleaner cut results in a healthier turf due to reduced tendancy to thatch build-up. In the golf course example, a better playing surface results from a cleaner cut since ball roll is improved. The second category is the "clip." Those skilled in the art will recognize that a reel mower cuts turf in a manner which creates slight undulations in the height of the turf. The difference in linear distance between adjacent peaks of the undulations are commonly referred to as the clip. While reduction of the clip maximizes the appearance of turf, the required high reel speed at higher ground speeds creates an unclean cut—due to a knocking over of the blades of grass rather than cutting, among other problems. Thus, the complete elimination of the clip is at odds with the foregoing goal of achieving a high ground speed. Accordingly, a certain amount of clip must be tolerated, and, in fact, it has been found that certain clips can be aesthetically pleasing. The difference in height between the troughs and peaks will be referred to herein as the restitution height, and it will be appreciated that such height is interelated to the clip——and in fact aids in the clip length to be apparent to an observer. A more detailed discussion of clip is presented further below.

In the past, the cutting reel speed has been fixed to the speed of the wheels in a mechanical manner. For example, The Toro Company, assignee of the present application, has for many years manufactured and sold a turf maintenance device under the model designation Spartan ®. In this device the reel cutting units are driven by mechanical gears which in turn are driven by wheels which engage the ground. The device employed a fixed ratio such that the faster the ground speed, the faster the reel speed. One problem presented by this system is that it does not take into account the height of cut, which must be considered when determining the optimized clip. A second problem with such a mechanical reel drive system is that to optimize the clip the reel speed is not a constant linear function of ground speed. Since the operators of the equipment may either not understand these requirements or may forget, a less than optimum clip often results.

Other systems, such as the mower identified by the model designation Reelmaster ® 223-D, also manufactured by The Toro Company, provide a variable reel speed control. This control allows an operator to manually adjust the opening of the hydraulic fluid passageway in the manifold of the reel drive system in order to vary the reel speed. Accordingly, this system provides a mechanically preset adjustment which should be based on ground speed, number of cutting blades on the reel, and the intended height of cut ("HOC"). However, the system is not dynamic in the sense that it is not self correcting (i.e., there is no feedback control taking into account the actual ground speed, and no corrections are made without operator intervention). The drawback of such a system is that it is wholly dependent upon the operator presetting the system correctly and to continue to operate the mower at the intended speed during the mowing process. Not only is such a system not predictable due to the human element introduced, but it also introduces additional time required to mow the various areas if adjustments are required.

Accordingly, there arises a need for a turf maintenance vehicle controller which preferably includes an automated reel speed system to optimize clip, as well as providing additional features.

SUMMARY OF THE INVENTION

The present invention provides for an automated clip control device for maintaining a predetermined clip at varying ground speeds, heights of cut, and other changed conditions. A preferred controller device constructed according to the principles of the present invention optimizes the reel speed of the mower based upon a feedback control loop, using as input the ground speed of the mower, the number of blades on the reel, and height of cut, among other factors.

In a preferred embodiment of a device constructed according to the principles of this invention, the controller apparatus includes ground and reel speed sensors to provide input to a controller device, a microprocessor to coordinate the optimized clip control, and electronically controlled valve devices for adjusting the hydraulic fluid flow to the reel drive motors. The microprocessor utilizes speed information from sensors to determine the actual speed of the reels and then compares the actual speed against a predetermined target value. The microprocessor then calculates the difference, change and summation error values and uses the values in a proportional, differential, and integral control process equation ("PID"). The solution of the PID equation is used to determine the duration of an output pulse width modulated signal which is provided to a valve controlling hydraulic fluid flow to the reel motor.

The target value of the reel speed is determined by reading the desired height of cut value and the number of blades per reel, and then going to a look-up table which contains optimized "linear distance traveled per time grass is cut" values. Once the appropriate look-up table target value is found, the target reel speed is determined by finding the product of the number of blades on the reel times the target clip times the ground speed times a constant (to correct for units).

Another feature of a preferred embodiment of the present invention is the utilization of pulse width modulated valve devices in the hydraulic fluid manifold to control the fluid flow rate (i.e., volume per unit of time), and hence speed, of the reels. The preferred embodiment utilizes a system wherein the valves are normally open to provide a path of lesser resistance to the hydraulic fluid back to a reservoir tank. When a pulse width modulated voltage is applied to a solenoid in the valve, the valve closes forcing more oil through the reel motor. Those skilled in the art will appreciate that such a system might also be accomplished utilizing a valve in-line to the reel motor which is normally closed.

Still another feature of the present invention is the utilization of a table of required conditions prior to engaging and/or allowing specific machine functions. Since a microprocessor is included in the preferred embodiment reel speed controller, the advanced functionality of the processor may be further utilized by including an advanced logical grid of allowed conditions of turf maintenance operations.

Yet another feature of the present invention is the inclusion of advanced diagnostic capabilities. In the preferred embodiment the processor determines whether any fault conditions exist and notifies the operator of the same. Further, the condition of the various inputs and outputs to the processor is preferably provided to a diagnostic port which allows for discerning the status of the same upon the occurrence of the fault. The diagnostic port may also include a memory buffer to store a plurality of conditions thereby keeping a log of the status of the turf maintenance vehicle. The memory buffer may be sized according to the desired amount and/or timed length of information. Such stored information is generally very helpful to maintain such vehicles.

Therefore, according to one aspect of the invention, there is provided a control system for controlling the reel speed of a turf mower, comprising: first sensing means for determining the rotational speed of the reel and for providing a sensed rotational speed signal; second sensing means for determining the ground speed of the mower and for providing a sensed ground speed signal; and first control means, operatively connected to said first and second sensing means, for receiving said sensed rotational and ground speed signals, for comparing said sensed rotational speed with a predetermined speed value based upon said sensed ground speed signal, and for calculating an error signal using control process equations, wherein the reel speed is controlled to optimize the clip.

According to another aspect of the invention, there is provided, a reel cutting system for a turf maintenance vehicle comprising: a prime mover; a hydraulic pump energized by said prime mover; a manifold system for controlling the flow of hydraulic fluid to in accordance with control signals; a cutting reel operatively rotated by a hydraulic fluid motor; clip control means comprising: first sensing means for determining the rotational speed of said reel and for providing a sensed rotational speed signal; second sensing means for determining the ground speed of the turf mower and for providing a sensed ground speed signal; and first control means, operatively connected to said first and second sensing means, for receiving said sensed rotational and ground speed signals, for comparing said sensed rotational speed with a predetermined speed value based upon said sensed ground speed signal, and for calculating an error signal using control process equations, wherein said first control means generates a control signal for said manifold, whereby the reel speed is controlled to optimize the clip.

These and other advantages and features which characterize the present invention are pointed out with particularity in the claims annexed hereto and forming a further part hereof. However, for a better understanding of the invention, the advantages and objects obtained by its use, reference should be made to the drawing which forms a further part hereof, and to the accompanying descriptive matter, in which there is illustrated and described a preferred embodiment of the present invention.

BRIEF DESCRIPTION OF THE DRAWINGS

In the Drawing, wherein like reference numerals and letters indicate corresponding elements throughout the several views.

DETAILED DESCRIPTION OF THE PREFERRED EMBODIMENT

The principles of this invention apply to the monitoring and active modification of parameters in a control system, The apparatus and method include the updating and control of the system in accordance with predetermined criteria to achieve a desired clip of mown turf. As used herein, clip shall be defined as the linear distance between adjacent peaks of the turf cut by the reels. A preferred application for this invention is in the monitoring and control of reel speed in a turf maintenance vehicle.

As noted above, although the example of mowing in a golf course environment will be utilized herein, those skilled in the art will appreciate that such application is only one of many mowing type environments in which the principles of the present application might be utilized. Accordingly, the golf/fairway examples presented herein should not be construed in a limiting manner. Also, those skilled in the art will appreciate that although the present clip control device is illustrated in the Figs. as residing on a particular turf mower having a predefined number of blades per reel, it should be understood that any number of reels and blades per reel can be controlled by the present invention.

In order to better present and describe the preferred embodiment of the present invention, the detailed description will be deferred pending a discussion of the term "clip" and a description of the PID control process.

Figure 8:
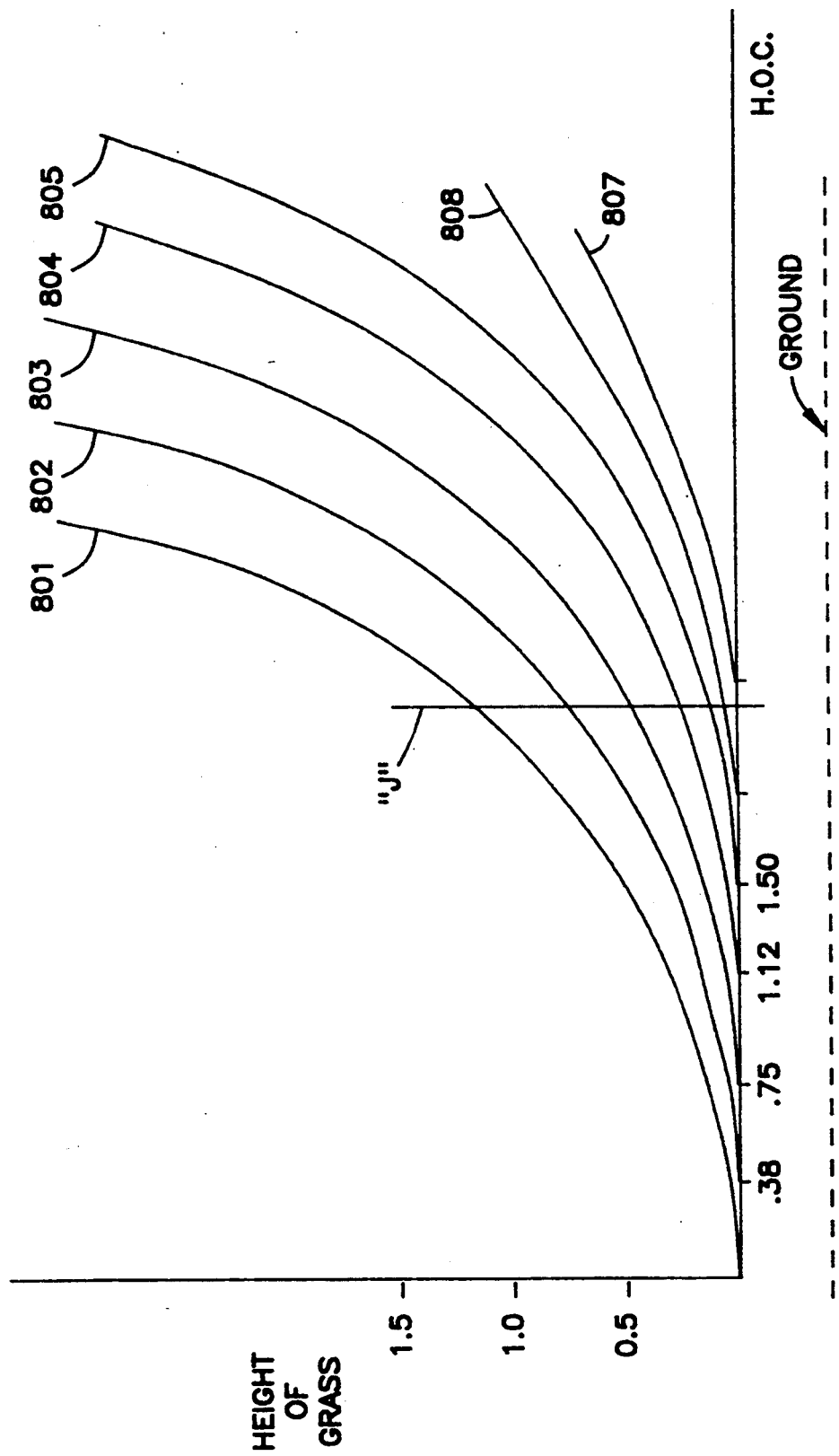
FIG. 8 is a graphic illustration of the paths taken by representative points on the edge of successive blades of a reel as the reel rotates and moves forward over turf.
Figure 9:
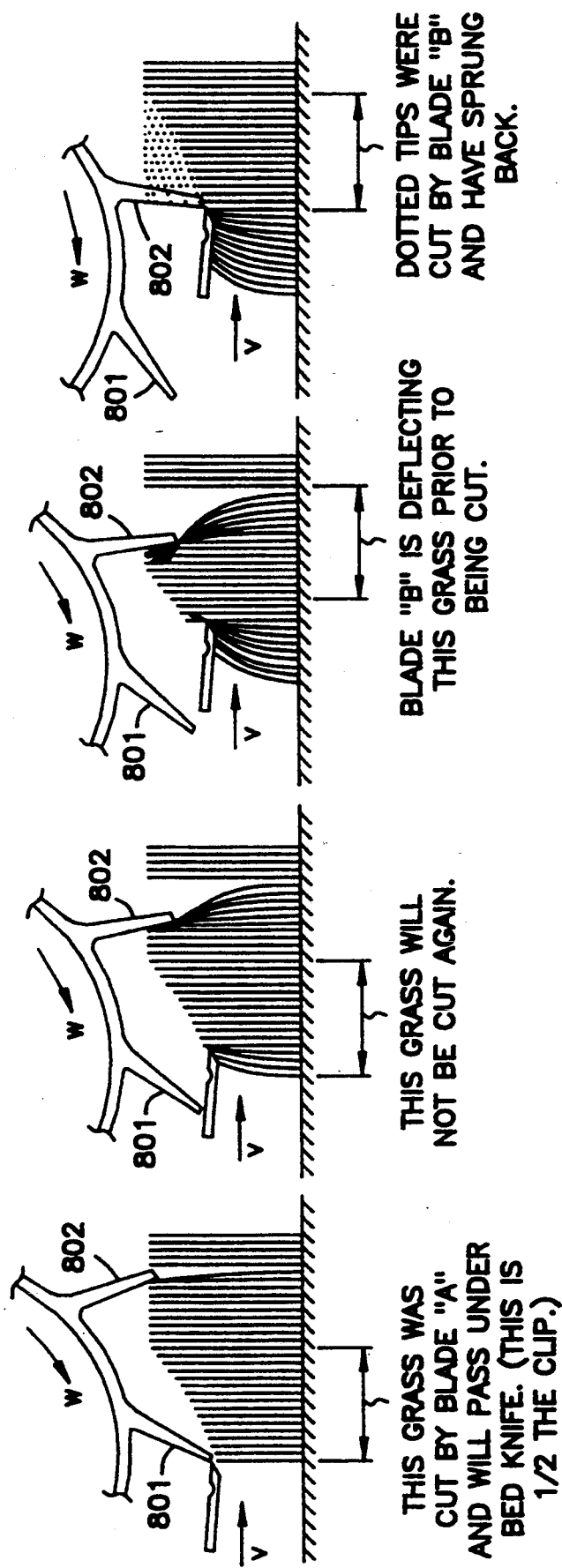
FIG. 9 is a graphic illustration of blades A and B moving past a bed knife and the cut which results.
Figure 10B:
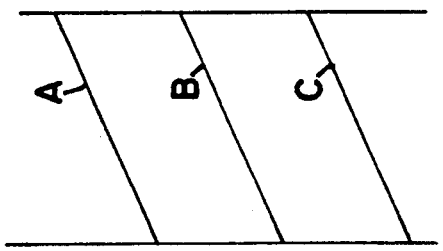
FIG. 10b is a diagrammatic illustration of a top view of the resulting shape of the grass as cut by the reel blades in FIG. 9.
Figure 10A:
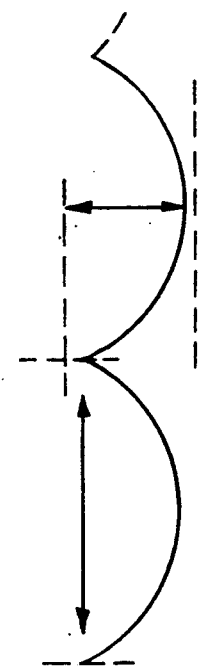
FIG. 10a is a diagrammatic illustration of the side cross section view of the resulting shape of the grass as cut by the reel blades in FIG. 9.

First, as briefly noted above, and as those skilled in the art will appreciate, clip may be defined as the geometrical relationship of the linear distance between adjacent peaks of grass blades over a distance subsequent to a reel mower having passed over the grass in an operative manner (i.e., cutting manner). Briefly, clip is caused by the individual reel blades passing in a circumferential manner about an axis of rotation, while the axis of rotation moves along a line. Referring to FIGS. 8, 9 and 10, it may be seen that as this movement occurs, the grass is "pulled" by the blade (best seen in FIG. 8) toward the bed knife momentarily prior to cutting. Since the grass is not all rooted at the same distance from the bed knife, varying lengths are pulled prior to cutting. Accordingly, undulations in the resulting cut grass are formed (best seen in FIG. 10a and 10b) with the varying heights termed herein as the restitution height. As the clip becomes more pronounced (i.e., more discernable due to the greater restitution height), the cut grass takes on a corrugated look. Those skilled in the art will appreciate that the restitution height is roughly analagous to an amplitude while the clip is analagous to a wavelength.

FIG. 8 illustrates the concept of a number of blades 801–807 striking the grass prior to being cut. In FIG. 8, each of the curves describes the arc of a representative point on a blade as it moves about the reel's axis of rotation, while the entire reel itself is moving in a direction. The X-axis describes the path of the bed knife, while the Y-axis describes the height of grass. It will be appreciated that the blade of grass "J" illustrated will merely be pushed over and will not be cut until the length is sufficient to be bent over to the point where the curve intersects the X-axis. Thus, grass "J" would first be cut by blade path 803 and one or more subsequent blades, but will not be cut shorter than the distance from the intersection of blade path 806 with the X-axis. Therefore, as the blades of grass get closer to the intersection of the blade path to the X-axis, the cut length decreases to the trough of the clip. While conversely the peaks of the clip are formed by the blades of grass furthest away on the X-axis from the intersection, but prior to the next intersection. FIGS. 10a and 10b further illustrate clip and restitution height.

It should also be noted that as reels are turned about the axis of rotation faster, the grass is less likely to spring back up to be cut after being bent by a blade which does not cut the grass. This results in straggler pieces which create an unclean cut.

As those skilled in the art will appreciate, there is not a common definition of an optimized exact clip other than by intuitive feel or by empirical study. Previously, it was commonly thought that clip should be equivalent to the height of cut. However, it has been found empirically that many lawn and/or turf care professionals have ideas about optimized clips which do not correlate to such a rote formula (although it should be stressed that if in fact such a formula is desired, the look-up table of the present invention, discussed below, could be modified to accomplish that result). Therefore, the present invention provides for a predetermined optimization of clip, while it is also recognized that other predetermined clips may be desired in other settings.

With the foregoing in mind, it has been determined through empirical analysis that an optimized clip may be achieved by cutting turf in accordance with the following table.

TABLE 1

| H.O.C. Setting | Nominal H.O.C. | 2 MPH 8 Blade | 4 MPH 8 Blade | 6 MPH 8 Blade | 8 MPH 8 Blade |
|---|---|---|---|---|---|
| A | | FULL SPEED | | | |
| B | 0.250 | 0.288 | 0.288 | 0.331 | 0.331 |
| C | 0.300 | 0.245 | 0.245 | 0.282 | 0.282 |
| D | 0.350 | 0.403 | 0.403 | 0.463 | 0.463 |
| E | 0.400 | 0.460 | 0.460 | 0.529 | 0.529 |
| F | 0.450 | 0.518 | 0.518 | 0.596 | 0.596 |
| G | 0.500 | 0.575 | 0.575 | 0.661 | 0.661 |
| H | 0.550 | 0.633 | 0.633 | 0.728 | 0.728 |
| I | 0.600 | 0.658 | 0.658 | 0.757 | 0.757 |
| J | 0.650 | 0.680 | 0.680 | 0.782 | 0.782 |
| K | 0.700 | 0.710 | 0.710 | 0.817 | 0.817 |
| L | 0.750 | 0.740 | 0.740 | 0.851 | 0.851 |
| M | 0.800 | 0.768 | 0.768 | 0.883 | 0.883 |
| N | 0.850 | 0.795 | 0.795 | 0.914 | 0.914 |
| O | 0.900 | 0.822 | 0.822 | 0.945 | 0.945 |
| P | 0.950 | 0.850 | 0.850 | 0.978 | 0.978 |
| H.O.C. Setting | Nominal H.O.C. | 2 MPH 5 Blade | 4 MPH 5 Blade | 6 MPH 5 Blade | 8 MPH 5 Blade |
| A | | FULL SPEED | | | |
| B | 0.500 | 0.500 | 0.500 | 0.520 | 0.520 |
| C | 0.562 | 0.550 | 0.550 | 0.572 | 0.572 |
| D | 0.625 | 0.605 | 0.605 | 0.629 | 0.629 |
| E | 0.688 | 0.650 | 0.650 | 0.676 | 0.676 |
| F | 0.750 | 0.710 | 0.710 | 0.738 | 0.738 |

TABLE 1-continued

| | | | | | |
|---|---|---|---|---|---|
| G | 0.813 | 0.760 | 0.760 | 0.790 | 0.790 |
| H | 0.875 | 0.810 | 0.810 | 0.842 | 0.842 |
| I | 0.938 | 0.850 | 0.850 | 0.884 | 0.884 |
| J | 1.000 | 0.930 | 0.930 | 0.967 | 0.967 |
| K | 1.063 | 0.980 | 0.980 | 1.019 | 1.019 |
| L | 1.125 | 1.035 | 1.035 | 1.076 | 1.076 |
| M | 1.188 | 1.090 | 1.090 | 1.134 | 1.134 |
| N | 1.250 | 1.140 | 1.140 | 1.186 | 1.186 |
| O | 1.312 | 1.180 | 1.180 | 1.227 | 1.227 |
| P | 1.375 | 1.240 | 1.240 | 1.290 | 1.290 |

Figure 4:
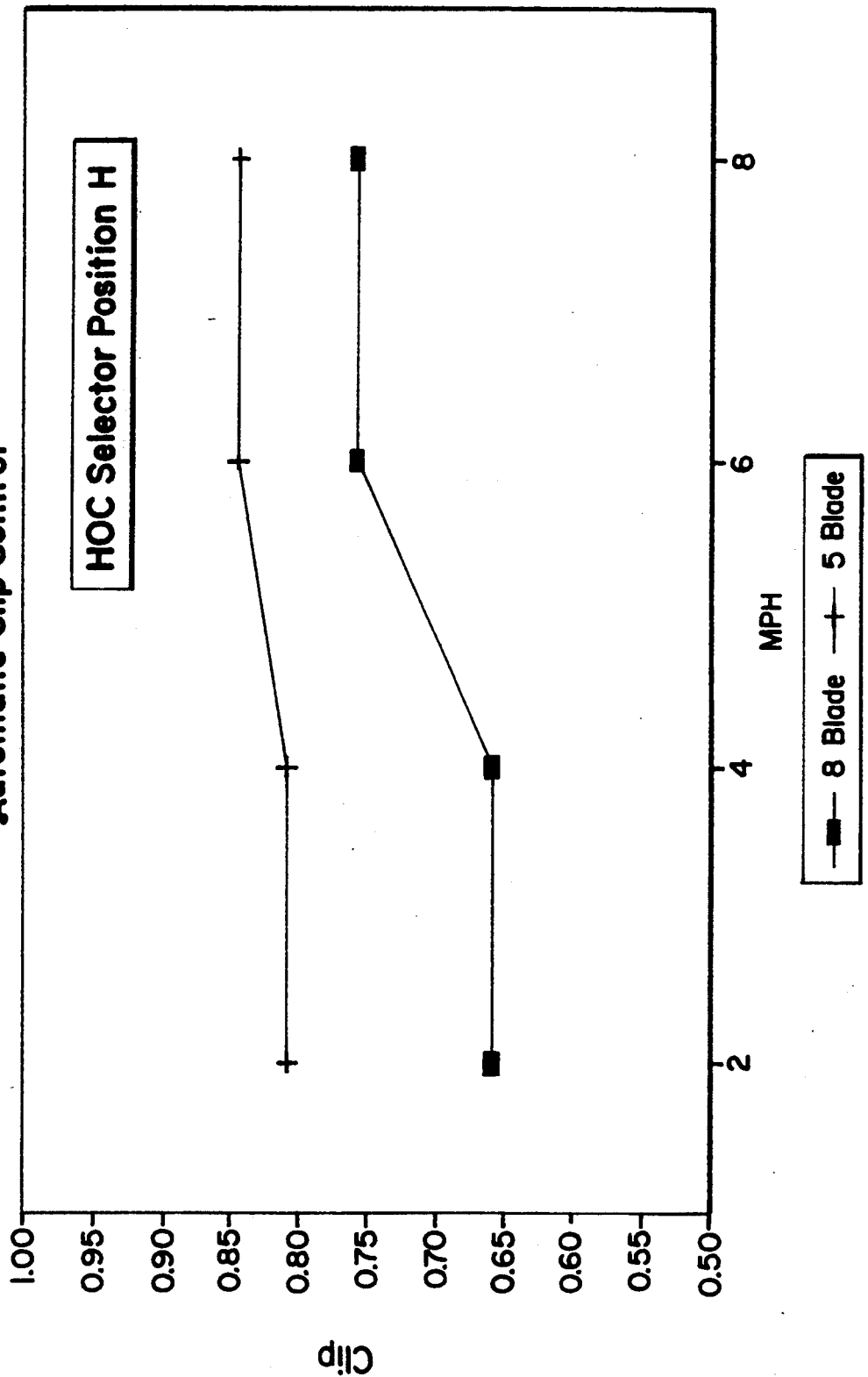
FIG. 4 is a graphical illustration of the data points comprising a look-up table stored in block 107 of FIG. 3 which act as input to the PID control.

The data points comprising the foregoing table are graphically illustrated in FIG. 4. The rightmost four columns comprise the clip in inches. It should also be pointed out that while the height of cut ("HOC") positions are those utilized in the preferred embodiment, any combination of HOC positions might be used. Also, it should be noted that between the 4 and 6 MPH speeds, the values are linearized. Further, the reel speed itself is regulated to reside between maximum and minimum values which are predetermined (i.e., "clamped"). Finally, while not entirely understood, it is theorized by Applicants herein that the difference between the 8 and 5 blade results relates to the fact that a 5 blade reel is generally used for higher HOC's and the blade paths differ slightly.

Second, to control the reel speed, the clip controller apparatus utilizes a feedback loop. In the preferred embodiment, this feedback loop includes a PID control algorithm. However, those skilled in the art will appreciate that other control equations, such as proportional, proportional-derivative, fuzzy logic, etc., and other types of control devices may also be used. The general form of a PID equation in the time domain is as follows:

$$u(t) = K_p e(t) + K_i \int e(t) dt + K_d de(t)/dt$$

where Kp, Ki and Kd are the respective constants for the proportional, integral and derivative terms respectively. u(t) is the output and e(t) is the error signal for the system being controlled. For a more detailed discussion, reference may be had to Dorf, *Modern Control Systems*, pp. 379 et seq. (*1981*). The constants for the preferred embodiment of the present system control were derived empirically, and may be changed depending upon the desired reel speed. Those skilled in the art will appreciate that the constants may also be derived by determination of the transfer function from the steady-state response or other such methods as are well known in the art.

Figure 5:
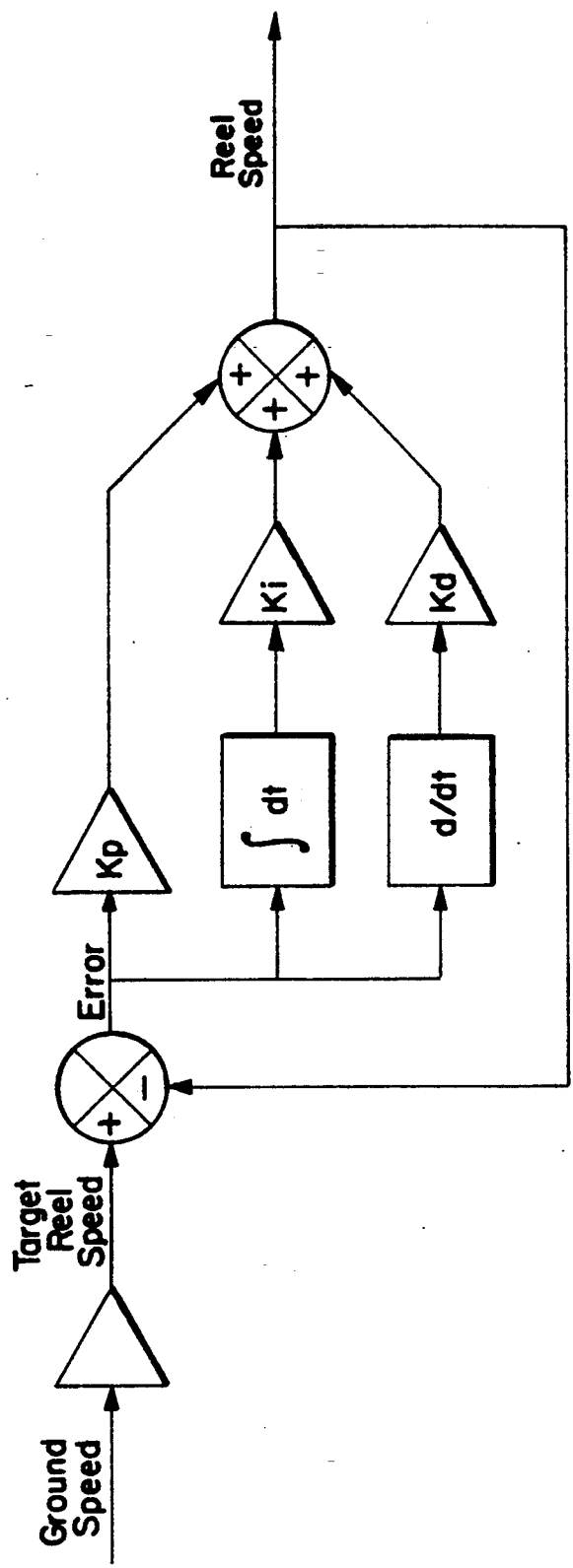
FIG. 5 is a logical control process diagram of the PID control utilized by the clip controller apparatus.

By using PID control, the reel speed is properly and quickly maintained at predetermined speeds depending on various parameters. FIG. 5 illustrates the functional PID control loop. As noted above, those skilled in the art will appreciate that other types of control algorithms or equations could be used.

Figure 1:
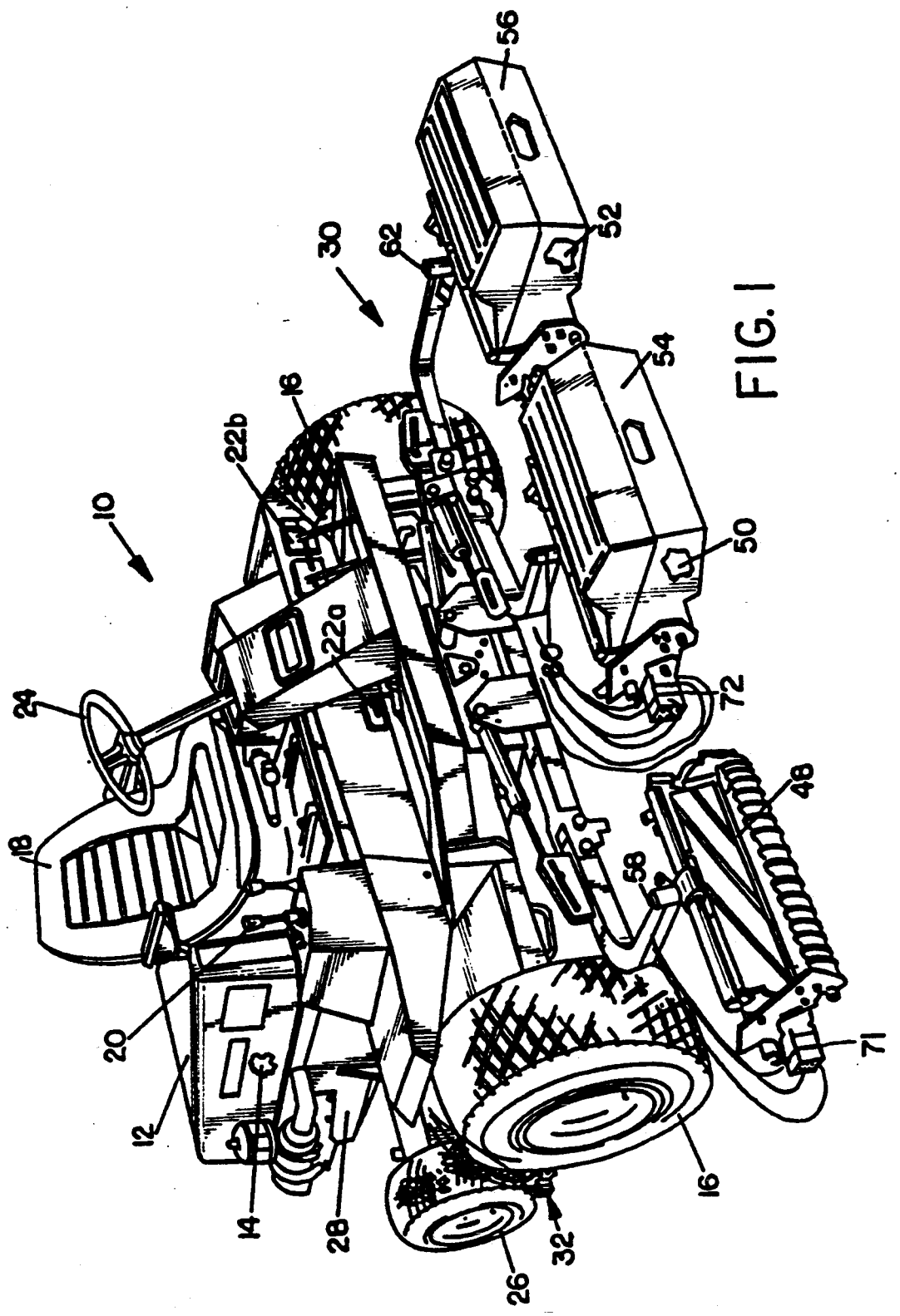
FIG. 1 is a perspective view of a commercial riding turf mower 10 on which a clip control apparatus constructed acceding to the principles of the present invention may be utilized.

Referring now to the Figs., there is illustrated a preferred embodiment clip control apparatus configured in accordance with the principles of the present invention. Referring particularly to FIG. 1, there is shown a typical commercial riding mower 10 with which the present invention may be used. As noted above, such mowers are typically utilized for cutting large areas such as golf courses, football fields, parks and the like. The mower 10 includes a rear housing 12 enclosing an engine compartment 14 which is hydraulically coupled via a transmission (best seen in FIG. 2) to a pair of front driving or traction wheels 16. The operator sits in a seat 18 positioned in front of the engine housing 12 and controls operation of the mower 10 by means of hand controls 20, foot controls 22, and a steering wheel 24 which is cooperatively connected to a pair of rear steering wheels 26, only one of which is shown. The rear steering wheels 26 are of relatively smaller diameter and tread than the front traction wheels 16, for purposes of better maneuverability.

Still referring to FIG. 1, the mower 10 includes a frame having a projecting forward platform on which the foot controls 22a, 22b and pedestal for steering wheel 24 are mounted. A front lift arm assembly 30 is mounted on the front end of frame 28 between the front wheels 16, while a rear lift arm assembly 32 is mounted on the frame between the front wheels and the rear wheels 26. As will be explained more fully below, the lift arm assemblies 30 and 32 include lightweight cutting reels mounted on pivotal lift arms that are normally biased by adjustable spring assemblies downwardly into contact with the turf. Hydraulic cylinders operate to raise and lower the lift arms between their extreme positions. The operation of the lift arm assemblies is discussed more fully in U.S. Pat. No. 5,042,236, which is hereby incorporated herein by reference.

Cutting reels are mounted on the outer end of each of the lift arms of the front lift arm assembly 30. More particularly, cutting reel 48 is secured to the outer end of the right outboard lift arm 36, cutting reel 50 is secured to the outer end of the middle lift arm 38, and cutting reel 52 is mounted on the outer end of the left outboard lift arm 40. Each of the cutting reels 48, 50 and 52 is of substantially conventional construction, including hydraulically driven transverse blades positioned between front and rear transverse rollers. Such cutting reels 48, 50 and 52 are usually enclosed by grass shields and baskets, only two of which shields/baskets 54 and 56 are shown in FIG. 1 for the purposes of clarity.

Rear lift arm assembly 32 is mounted on the lower frame 28 between the front wheels 16 and the rear wheels 26. The rear lift arm assembly 32 includes left and right lift arms 120, only one of which is shown. Both arms are supported and biased downwardly by hydraulic actuators and adjustable spring assemblies respectively similar to those in front lift arm assembly 30.

Figure 2:
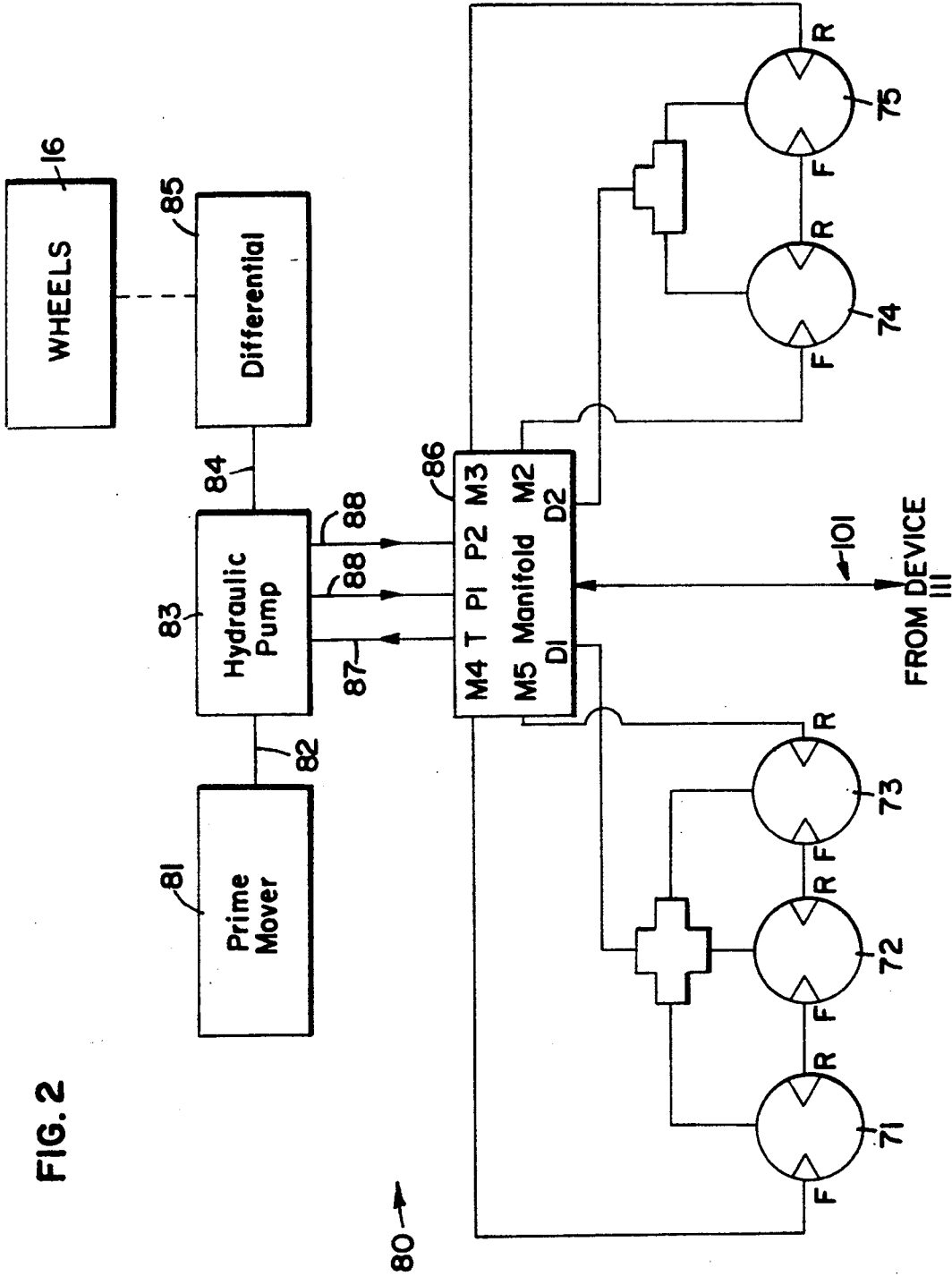
FIG. 2 is a block diagram illustrating the hydraulic fluid system of the mower 10 of FIG, 1.

Moving now to FIG. 2, there is illustrated the preferred hydraulic system 80. The hydraulic system 80 is energized by prime mover 81 which is cooperatively connected via drive shaft 82 to hydraulic pump 83. Hydraulic pump 83 is in turn connected to differential 85 via shaft 84. As those skilled in the art will appreciate, the differential 85 drives the wheels 16 in response to commands from an operator via the foot control 22a. Hydraulic pump 83 is connected to manifold 86 via input and output lines 87, 88 respectively and includes a hydraulic fluid reservoir tank. In the preferred embodiment, pump 83 is manufactured by Webster Fluid Power Products, Inc. of Easley, S.C., under the model designation 49913-6.

The manifold 86 includes connections for various devices and apparatus driven by hydraulics on the mower 10 including lifting the reels on the front reel deck 30 and rear reel assembly 32. For clarity the connections at manifold 86 are not shown in FIG. 2, but are illustrated in FIG. 7.

The reels are driven hydraulically via hydraulic motors 71 through 75. In the preferred embodiment, the hydraulic motors utilized are manufactured by Webster Fluid Power Products, Inc. of Easley, S.C., under the model designation 152-10000353 and are preferably of the constant displacement type. The motors 71-75 are cooperatively connected to the reels in a well known manner such that when hydraulic fluid passes through the reel motors 71-75, the reels rotate.

Microprocessor 102 (discussed in more detail below) is cooperatively connected to the manifold 101 to operate various valves within manifold 86. The valves (best seen in FIG. 7) control the hydraulic fluid flow to hydraulic motors 71-75.

Figure 7:
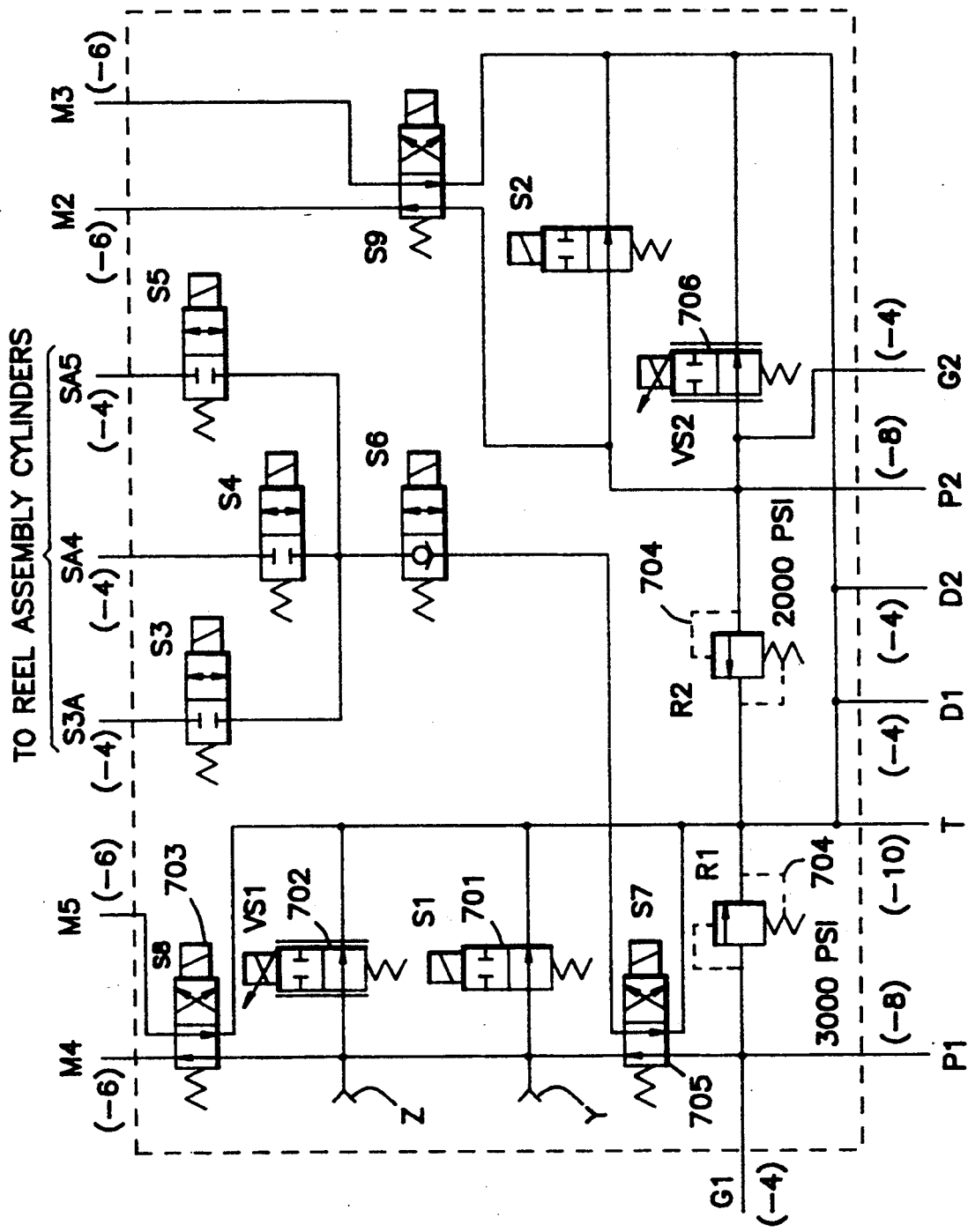
FIG. 7 is a schematic diagram of the hydraulic fluid manifold block 86 of FIG. 2.

Turning next to FIG. 7, it will be appreciated that the hydraulic fluid flow is assumed to be constant for a given motor speed. The flow will be described with respect to the front mower assembly, and it will be understood by those skilled in the art that the rear mower assembly 32 operates in a similar manner.

Hydraulic fluid enters the manifold 86 via line P1 and passes by pressure relief valve 704 which is normally closed. The fluid then passes through valve 705 which operates to provide fluid to the up and down operation of the front reel assembly. The remaining fluid continues to intersection "Y" wherein the fluid continues toward intersection "Z" if valve 701 is closed, but returns to the tank line "T" if the valve 701 is open. In the preferred embodiment, valve 701 is normally open which provides for a path of lesser resistance for the hydraulic fluid. When microprocessor 102 closes valve 701, then the hydraulic fluid continues toward intersection "Z."

Figure 12:
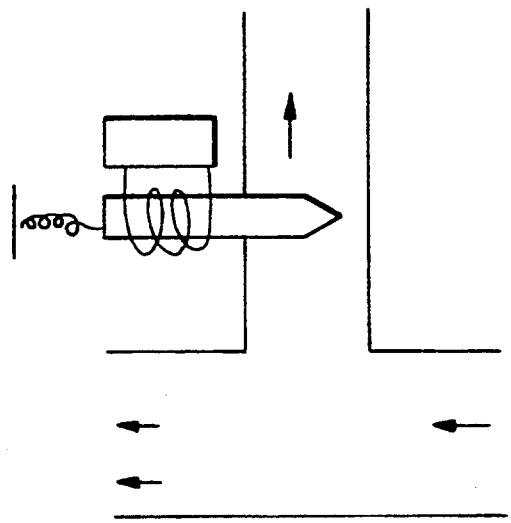
FIG. 12 is a diagrammatic illustration of valve 702 of FIG. 7.

At intersection "Z" the hydraulic fluid again encounters a normally open flow path through valve 702. Accordingly, the fluid will normally flow through valve 702 toward the tank line "T" since there is less resistance than flowing through a reel motor 71, 72, or 73. As valve 702 is closed a larger amount of hydraulic fluid is forced to continue toward line M4 to the reel motors 71-73. The valve closes as a solenoid is energized by a pulse width modulated signal from the microprocessor 102. Therefore, as the duty cycle of the signal increases, the valve closes further. A spring normally biases the valve open. FIG. 12 diagrammatically illustrates valve 702. It will be appreciated that the valves 700-706 are generally of the variable orifice type.

Finally, the hydraulic fluid passes through diverter valve 703 which provides for diverting the fluid to operate the reels backward to enable backlapping.

Figure 3:
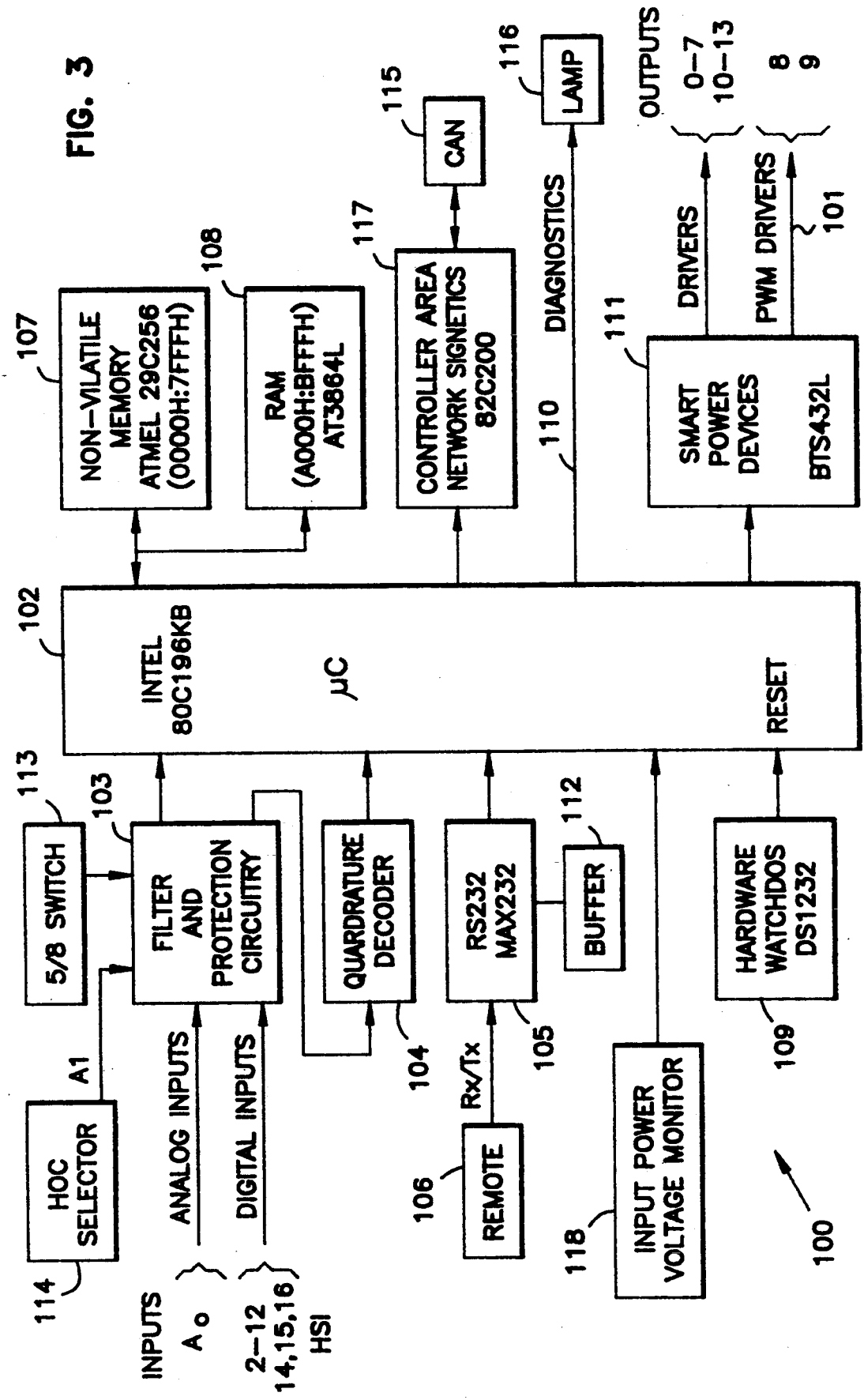
FIG. 3 is a functional block diagram illustrating the electronic components comprising a preferred embodiment clip controller apparatus.

Turning next to FIG. 3, a preferred embodiment clip controller functional block diagram is presented. The clip controller electronic components are illustrated generally at 100. The heart of the controller 100 is microprocessor 102. Providing inputs to the microprocessor is filter and protection circuitry block 103 which includes analog and digital inputs. The inputs and outputs of microprocessor 102 are set forth below in Table 2 as follows:

TABLE 2

| Inputs: | Outputs: |
| --- | --- |
| A0 Start | 13 Preheat |
| A1 HOC Pot | 12 Start |
| 2 Run | 7 ETR Hold - Run/Alt. |
| 3 Neutral Switch | 10 S1 |
| 4 Seat Switch | 1 S8/S9 |
| 5 Temperature | 2 S2 |
| 6 Temp. Override | 3 S3 |
| 7 Raise | 4 S4 |
| 8 Enable | 5 S5 |
| 9 Down Switch | 6 S6 |
| 10 Front Backlapping | 11 S7 |

TABLE 2-continued

| Inputs: | Outputs: |
| --- | --- |
| 11 Rear Backlapping | 8 VS1 |
| 12 Lower | 9 VS2 |
| 13 5/8 Blade Reel switch | 0 Out of Range light |
| 14 Front Reels HSI | |
| 15 Back Reels HSI | |
| 16 Transmission Speed Sensor | |

Those skilled in the art will appreciate that these inputs and outputs are illustrative only and that other I/O functionality may be provided such that the microprocessor 102 and controller 100 in general operate in their intended manner. For example, the type of reel mower 10 may vary so as to provide different inputs to the filter and protection circuitry 103.

Certain inputs to the filter and protection circuitry block 103 are provided to the quadrature decoder ("QD") 104. The QD 104 receives the input from block 103 which was originally generated by encoder devices, such as optical encoders, to determine speed and direction of rotation (i.e., clockwise or counter-clockwise), although in the present preferred embodiment, only the speed information is utilized. Accordingly, reel-speed and ground-speed is determined at QD block 104. The process of determining the number of revolutions of transmission gear teeth and pickups on rotating objects such as the reels via optical encoders, Hall Effect switches, etc. is well known in the art and so will not be described further herein. Preferably magnetic pickups are used to determine the ground speed and reel speed although any number of other type devices may be used as will be appreciated.

RS-232 interface block 105 provides a two-way communication port to microprocessor 102 for diagnostics and testing. Additionally, a remote computer 106 may be utilized to provide field-loaded software instructions to reside in non-volatile memory block 107. Interface block 105 provides for the inclusion of advanced diagnostic capabilities. In the preferred embodiment the processor 102 determines whether any fault conditions exist and notifies the operator of the same via diagnostics line 110 which is connected to a warning lamp (not shown). Further, the condition of the various inputs and outputs to the processor is preferably provided to the diagnostic port block 105 which allows for discerning the status of the same upon the occurrence of the fault by use of a remote hand held logic decoder (not shown) which is programmed to decode the fault status data provided to the diagnostic block 105. The diagnostic port may also include an optional memory buffer 112 to store a plurality of conditions so as to keep a log of the status of the turf maintenance vehicle 10. The memory buffer 112 may be sized according to the desired amount and/or timed length of information. Such stored information is generally very helpful to maintain such vehicles. An example of the manner in which the fault/status of the machine may be provided to diagnostic block 105 is set forth in Table 3 is an eight (8) byte format with each bit representing an I/O line. The individual bits may merely be toggled to indicate the presence of the status of the I/O line and/or the presence of a fault. By toggling the bits, the hand held remote device may merely comprise appropriate logic and buffer devices to light LED's to signify the status and fault conditions. Additionally, a personal computer may be appropriately connected with proper software to the RS-232 port to analyze the diagnostic information.

TABLE 3

| BYTE | STATUS OF |
| --- | --- |
| 1 | Timing Character |
| 2 | Input switches 0-7 |
| 3 | Input switches 8-15 |
| 4 | Input switches 16, 17 |
| 5 | Output switches 0-7 |
| 6 | Output switches 8-13 |
| 7 | Fault status for outputs 0-7 |
| 8 | Fault status for outputs 8-13 |

Also connected to the processor 102 is block 108 which provides a power and voltage monitor function to the system 100. In the preferred embodiment, a resistive voltage divider feeds an analog-to-digital converter input to establish a digital representation of the battery voltage. Accordingly, block 108 may be used to calibrate input on other analog inputs to eliminate variations due to changes in input voltage.

Hardware watchdog block 109 provides a reset function by signaling the microprocessor's 102 reset line, if the watchdog block 109 is not toggled within a predetermined period of time. In the preferred embodiment, the watchdog block 109 is manufactured by Dallas Semiconductor of Dallas, Tex., having a model number designation DS1232.

Also providing inputs are HOC selector block 114 and the number of blades per reel block 113. Each of the foregoing blocks provides inputs to processor 102 which in the preferred embodiment is manufactured by Intel having a model designation 80C19JKB. The microprocessor 102 is preferably a 16 bit microcontroller. Included with microprocessor 102 is nonvolatile memory block 107 and random access memory block 108.

Additionally, a CAN or "controller area network" block 109 may be provided to enable high speed communication via a defined protocol to other optional CAN controllers 115 which may be located on mower 10.

Diagnostics output line 110 is provided to a lamp 116 preferably located in a position easily visible to an operator in order to notify the operator of a fault condition.

Finally, block 111 includes an output devices controller block which in the preferred embodiment is manufactured by Siemens Components of Santa Clara, Calif., having a model designation BTS432L. The device block 111 comprises high speed drivers with built-in thermal protection, over-current protection, and open-circuit detection. Any of the foregoing conditions are reported as faults to the microcontroller 102. The device block 111 includes a plurality of high side drivers and several high speed pulse width modulated drivers.

While not specifically detailed in FIG. 3, it will be understood that the various logic gates, flip-flops, microprocessors, etc. must be properly connected to appropriate bias and reference supplies so as to operate in their intended manner. Similarly, it will be understood that appropriate memory, clock oscillator, buffer and other attendant peripheral devices are to be properly connected to microprocessor 102 so as to operate in its intended manner.

As previously noted above in connection with the description of the hydraulic fluid system 80, the controller 100 controls the speed of the reels by providing a varied pulse width modulated signal to valves 702, 706.

Figure 6:
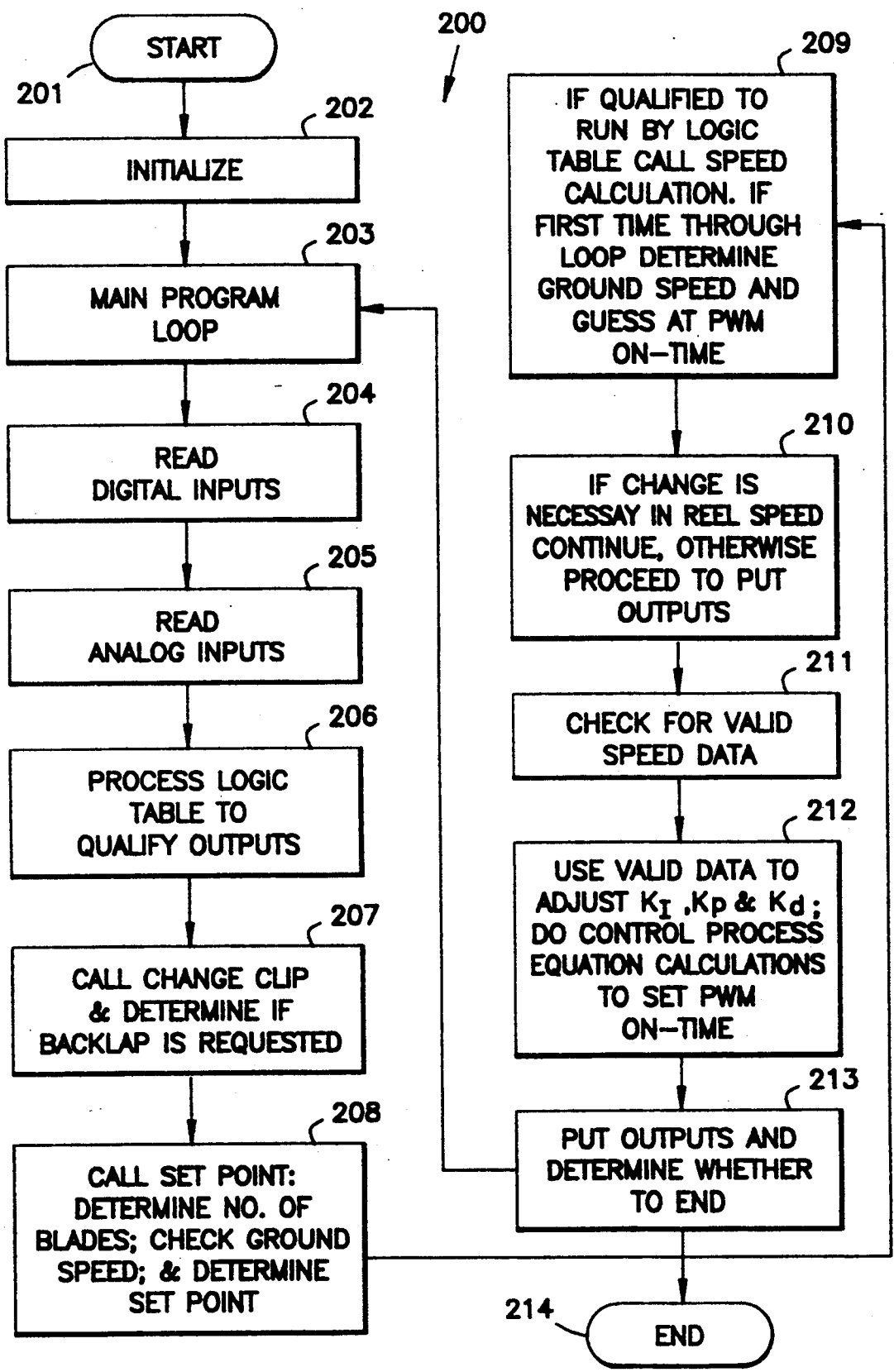
FIG. 6 illustrates a logic block diagram illustrating computer program operation by the microprocessor block 102 of FIG. 3.

Having now described in detail the hydraulic operation of the reels and the interconnection of the electronic controller 100, a discussion will now be presented describing the logic flow of the controller in carrying out the optimization of the clip control. In a preferred embodiment of a device constructed according to the principles of the present invention, the logic means comprises a microprocessor 102 which sequentially polls the inputs, including the asynchronous interrupts. A logic flow diagram of an embodiment of the program logic which might be resident in the microprocessor 102 or stored in nonvolatile memory block 107 or RAM 108 as illustrated in FIG. 6, wherein the logic diagram is shown generally at 200. The logic flow diagram 200 illustrates the steps taken to analyze the logical status of the various inputs and provide outputs to drive the reels at their proper speed relative to the ground speed (i.e., as illustrated in FIG. 6).

Although the microprocessor 102 will be characterized as "proceeding" from logical block to logical block, while describing the operation of the program logic, those skilled in the art will appreciate that programming steps are being acted on by microprocessor 102.

In operation, microprocessor 102 starts at block 201. Microprocessor 102 then proceeds to initialize at block 202. These functions include initializing the microprocessor, serial ports, input structures, output structures, high speed input processors, and high speed output processors (i.e., pulse width modulators).

At block 203, the microprocessor 102 begins the main control program loop.

The first step of the main program loop is to proceed to block 204 where the digital inputs are read. Next, proceeding to block 205, various analog inputs are read to determine whether it is appropriate to allow the prime mover fuel solenoid to turn on (i.e., in a diesel system; however, those skilled in the art will appreciate that in a gasoline system an ignition coil may be ungrounded). The interlocking system of inputs A0, A1, and 1-16 are decoded at block 205 to provide various logical features of the turf maintenance vehicle 10 described herein.

Microprocessor 102 then proceeds to block 206 where a logic table is processed based upon the decoded inputs. A representative logic table is set forth in FIG. 11. First at block 206, output states are qualified based upon the various input states. Additionally, the transmission speed is enabled if the operator has adjusted the controls 20 to a position other than neutral. At block 207 the change clip subroutine is run, first determining whether back lap of the reels is desired by the operator. If back lap is requested, both the height of cut selector 114 as set by the operator and the set point are determined.

If back lap is not requested the processor proceeds to block 208 and the set point subroutine is called. If 5 blade reels are being utilized, the ground speed is determined by interrupt driven routines based on high speed input devices measuring the rotation of a transmission gear driving wheels 16. Thus, the actual ground speed of the vehicle 10 may be used to vary the reel speed and optimize the clip. Given the determined ground speed, the set point is determined in accordance with a look-up table which includes the information set forth in Table 1 discussed above.

If a 5 blade reel is not being used, then the ground speed is determined via the high speed input interrupt driven routine and the set point is determined based on the 8 blade information.

Figure 11:
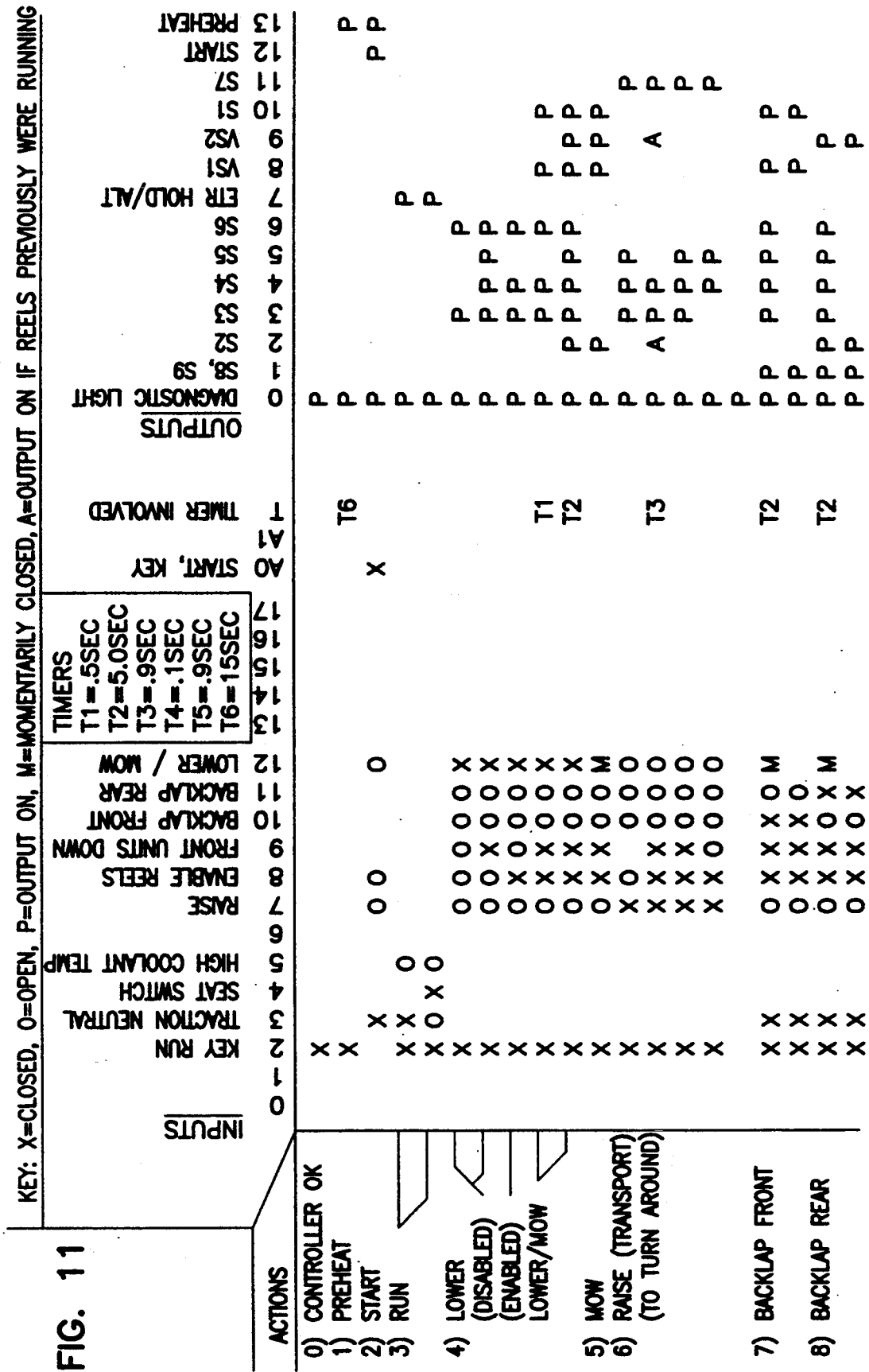
FIG. 11 is a representative logic table determined by the microprocessor 102 at block 209 of FIG. 6.

Moving to block 209, microprocessor 102 determines whether the reels are qualified to run by the logic table set forth in FIG. 11. Next, the speed calculation subroutine is called to determine the proper reel speed given the HOC and ground speed. Microprocessor 102 then proceeds to block 210 where it is determined whether a change in the reel speed is necessary. If no change is necessary, then the high speed output does not need to be changed and the microprocessor proceeds to block 213. However, if a change is necessary, then microprocessor 102 proceeds to block 211 to check for valid speed data (i.e., the data is invalid if it is too old or is zero). If the speed data is not valid then it is assumed that the reels have stopped and the microprocessor 102 increases the duty cycle to the flow control valves 702, 706. If the speed data is valid, microprocessor 102 uses the data at block 212 to adjust the KI, KP and KD PID control values. As noted above, the reel speed is clamped between two predetermined values which in the preferred embodiment are 600 r.p.m. and 1800 r.p.m. However, those skilled in the art will appreciate that the foregoing numbers may vary and the the clamping of the reel speeds may be determined by the speed required to cut the turf, to rid itself of the clippings and to avoid creating stragglers. Also, although the high end r.p.m. is limited by the controller 100, the system is also limited by the design of the hydraulic system 80.

The output is based upon the control equation as follows:

$$\text{PWM On Time} = \text{Error}/K_p + \text{Change Error}/K_d + Z \text{Error}/K_i$$

The PID computations to set the pulse width modulator on time is determined at block 212. The microprocessor 212 then proceeds to block 213, where fault data from the outputs is determined, qualified outputs are turned on if they have not faulted or been masked, and the diagnostic light is activated if any outputs have faulted. If the operator has activated a control 20 to turn off the vehicle 10, then the processor 102 proceeds to block 214, otherwise the processor proceeds to block 203 to begin the main program loop once again.

To summarize the computation of the target reel speed: First, the number of blades per reel is determined by checking the state of one of the inputs. Second, the ground speed is read from a memory location and checked for being current. Third, if the ground speed is greater than 6 MPH, then the speed is lowered 15% for 8 blade reels and 4% for 5 blade reels. This has the effect of expanding the clip. Ground speeds of less than 4 MPH are left unchanged. Speeds from 4 to 6 MPH are linearly adjusted to match the graph set forth as FIG. 4.

Fourth, the desired HOC is determined by reading analog input from the HOC selector block 114. Fifth, the target clip is looked up in a look-up table and the target reel speed is then the product of the number of blades times the target clip times the ground speed times a constant (to convert to correct units). Sixth, the actual reel speed is clamped and the target reel speed, if it exceeds the clamped values, is adjusted to the maximum or minimum values and a fault flag is set. Seventh, the PID constants are determined by the target reel speed. Eighth, the PWM on-time is determined by the PID algorithm. Finally, the PWM output signal is provided to the valve and the process begins again.

It is to be understood that even though numerous characteristics and advantages of the present invention have been set forth in the foregoing description, together with details of the structure and function of the invention, the disclosure is illustrative only and changes may be made in detail, especially in the control process algorithm and in the reel drive system. For example with regard to the latter, variable displacement or electric motors might be used. Further, although reels which include a certain number of blades are presented herein for purposes of illustration, other configurations might be used. Also, the reel speed of one or several of the reels included on the turf maintenance vehicle might be monitored. Other modifications and alterations are well within the knowledge of those skilled in the art and are to be included within the broad scope of the appended claims.

What is claimed is:

1. A control system for controlling the rotational speed of a reel of a turf mower, comprising:
   a) first sensing means for determining the rotational speed of the reel and for providing a sensed rotational speed signal;
   b) second sensing means for determining the ground speed of the mower and for providing a sensed ground speed signal; and
   c) first control means, operatively connected to said first and second sensing means, for receiving said sensed rotational and ground speed signals, for determining a target rotational speed value from said sensed ground speed signal, for comparing said sensed rotational speed with said target rotational speed value, and for determining an output signal from said compared values, wherein said output signal is related to said target rotational speed value, whereby the speed of the reel is controlled to optimize the clip.

2. The system of claim 1, wherein said first control means includes a microprocessor.

3. The system of claim 2, wherein said first control means determines said output signal using a control process algorithm having the following form:

$$u(t) = \text{Error}/K_p + \text{Change Error}/K_d + \Sigma\text{Error}/K_1$$

wherein u(t) is said output signal, and $K_p$, $K_d$ and $K_i$ are constants.

4. The system of claim 1, further comprising a visual indicator, and wherein said first control means is operatively connected to said visual indicator and activates said visual indicator when said target rotational speed value cannot be maintained, whereby an operator of the turf mower is alerted.

5. The system of claim 2, wherein said first control means further includes memory means for storing data.

6. The system of claim 5:
   wherein said memory means stores a control process algorithm used by said first control means for determining said output signal;
   further comprising a look-up table stored in said memory means which includes data related to desired clip lengths based on height of cut, number of blades per reel, and ground speed, and
   wherein said first control means determines said target rotational speed value from said look-up table.

7. The system of claim 5, further comprising a plurality of switch means for monitoring the status of various turf mower operative conditions, wherein each of said plurality of switch means is cooperatively connected to said first control means to provide the logical status of the monitored operative condition to said first control means, and wherein said first control means qualifies the operative state of the turf mower based upon a logic table stored in said memory means and said monitored operative condition inputs, whereby the turf mower operates only when predetermined operative condition inputs are received.

8. The system of claim 6, further comprising a two way communication port operatively connected to said first control means, wherein said control process algorithm may be modified by a remote computer.

9. The system of claim 5, further comprising a two way communication port, and wherein said first control means provides diagnostic information to said port.

10. The system of said 9, wherein said diagnostic information includes the status of the operation of said first control means.

11. The system of claim 9, further including second memory means for storing a rolling record of said diagnostic information.

12. The system of claim 2, wherein said first control means includes a controller area network communications device for communicating and interfacing with second control means on the turf mower.

13. A reel cutting system for a turf mower comprising:
    a) a prime mover;
    b) a hydraulic pump energized by said primer mover;
    c) a cutting reel operatively rotated by a hydraulic fluid motor;
    d) a manifold system for controlling the flow of hydraulic fluid from said hydraulic pump to said hydraulic motor in accordance with control signals; and
    e) clip control means comprising;
        i) first sensing means for determining the rotational speed of said reel and for providing a sensed rotational speed signal;
        ii) second sensing means for determining the ground speed of the turf mower and for providing a sensed ground speed signal; and
        iii) first control means, operatively coupled to said first and second sensing means, for receiving said sensed rotational and ground speed signals, for determining a target rotational speed value from said sensed ground speed signal, for comparing said sensed rotational speed with said target rotational speed value, and for calculating an output signal to establish a feedback control loop, wherein said first control means generates a control signal for said manifold system based on said output signal, and whereby the reel speed is controlled to optimize the clip.

14. The system of claim 13, wherein said first control means includes a microprocessor.

15. The system of claim 13, wherein said feedback control loop includes a control process algorithm having the following form:

$$u(t) = \text{Error}/K_p + \text{Change Error}/K_d + \Sigma \text{Error}/K_i$$

wherein u(t) is said output signal, and $K_p$, $K_d$ and $K_i$ are constants.

16. The system of claim 14, further comprising a plurality of valves located in said manifold system and responsive to said control signals, wherein said control signals control said valves to control the flow of hydraulic fluid.

17. The system of claim 14, further comprising a visual indicator, and wherein said first control means is operatively connected to said visual indicator and activates said visual indicator when said target rotational speed value cannot be maintained, whereby an operator of the turf mower is alerted.

18. The system of claim 14, wherein said first control means further includes memory means for storing data.

19. The system of claim 18, wherein said feedback control loop includes a control process algorithm stored in said memory means.

20. The system of claim 18, further comprising a look-up table stored in said memory means which includes data related to desired clip lengths based on height of cut, number of blades per reel, and ground speed; and
    wherein said first control means determines said target rotational speed value from said look-up table.

21. The system of claim 18, further comprising a plurality of switch means for monitoring the status of various turf mower operative conditions, wherein each of said plurality of switch means is cooperatively connected to said first control means to provide the logical status of the monitored operative condition to said first control means, and wherein said first control means qualifies the operative state of the turf mower based upon a logic table stored in said memory means and said monitored operative condition inputs, whereby the turf mower operates only when predetermined operative conditions inputs are received.

22. The system of claim 21, further comprising a plurality of valves located in said manifold system and responsive to said control signals, wherein said control signals control said valves to control the flow of hydraulic fluid, and wherein certain of said valves are not actuated until predetermined operative condition inputs are received.

23. A controller for a grass cutting machine, of the type having a cutting reel driven by a motor system, comprising:
    a) memory means for storing a control algorithm for use in a feedback control loop and data;
    b) first sensing means for determining the rotational speed of the reel and for providing a sensed rotational speed signal;
    c) a plurality of switch means for monitoring the status of various machine operative conditions, wherein each of said plurality of switch means provides the logical status of the monitored operative condition;
    d) processor means for:
        i) receiving said sensed rotational speed signal and determining an output signal to the motor system to maintain the reel at a desired speed in accordance with said control algorithm and said data wherein said data includes information on the ground speed of the turf mower and wherein the relationship between the desired speed of the reel and the ground speed is non-linear and is determined to optimize the clip; and
        ii) qualifying the operative state of the grass cutting machine in accordance with a logical table comprised of said data in said memory means and said monitored operative condition inputs, whereby the turf mower operates only when predetermined operative condition inputs are received.

24. The controller of claim 23, wherein said control algorithm has the following form:

$$u(t) = \text{Error}/K_p + \text{Change Error}/K_d + \Sigma \text{Error}/K_i$$

wherein u(t) is said output signal, and $K_p$, $K_d$ and $K_i$ are constants.

25. A reel cutting system for a turf mower, comprising:
   a) a prime mover;
   b) an energy transfer system energized by said prime mover, said system including a motor;
   c) a cutting reel operatively rotated by said motor; and
   d) clip control means comprising:
      i) first sensing means for determining the rotational speed of said reel and for providing a sensed rotational speed signal;
      ii) second sensing means for determining the ground speed of the turf mower and for providing a sensed ground speed signal; and
      iii) first control means, operatively coupled to said first and second sensing means, for receiving said sensed rotational and ground speed signals, for determining a target rotational speed value from said sensed ground speed signal, for comparing said sensed rotational speed with said target rotational speed value, and for determining an output signal in a feedback loop control,
   wherein said first control means applies said output signal to said motor, whereby the rotational speed of said motor, and hence the rotational speed of said reel, are controlled for optimizing the clip.

26. The reel cutting system of claim 25, wherein said system is a hydraulic system and wherein said motor is a hydraulic fluid motor.

27. A method for controlling the rotational speed of a reel of a turf mower, comprising the steps of:
   a) determining the rotational speed of the reel and providing a sensed rotational speed signal to a controller device;
   b) determining the ground speed of the mower and providing a sensed ground speed signal to said controller device wherein said controller device determines a target rotational speed value from said sensed ground speed signal;
   c) comparing said rotational speed of the reel with said target rotational speed value; and
   d) determining an output signal from said compared values, wherein said output signal is related to said target rotational speed value of the reel and is used as an output signal in a feedback loop, whereby the speed of the reel is controlled to optimize the clip.

28. The method of claim 27, further comprising the steps of creating a pulse width modulated signal based on said output signal for controlling a motor connected to the reel.

29. The method of claim 27, wherein said control process algorithm of said calculating step has the following form:

$$u(t) = \text{Error}/K_p + \text{Change Error}/K_d + \Sigma \text{Error}/K_i$$

wherein u(t) is said output signal, and $K_p$, $K_d$ and $K_i$ are constants.

30. The method of claim 27, further comprising the step of activating a visual indicator when said target rotational speed value cannot be maintained, whereby an operator of the turf mower is alerted.

* * * * *

UNITED STATES PATENT AND TRADEMARK OFFICE
CERTIFICATE OF CORRECTION

PATENT NO. : 5,394,678
DATED : March 7, 1995
INVENTOR(S) : Lonn et al.

It is certified that error appears in the above-identified patent and that said Letters Patent is hereby corrected as shown below:

On column 4, line 48, please delete "acceding" and substitute therefore --according--

On column 11, line 32, please delete "80C19JKB" and substitute therefore --80C196KB--

On column 13, line 24, please delete "the" (2nd occurrence) and insert --that--.

On column 13, line 33, please delete "Z" and substitute therefore --$\Sigma$--

On column 14, line 44, please delete "/$K_1$" and substitute therefore --/$K_i$--

On column 15, line 30, please delete "primer" and substitute therefore --prime--

On column 15, line 62, please delete "$K_4$" and substitute therefore --$K_d$--

Signed and Sealed this

Eleventh Day of July, 1995

Attest:

BRUCE LEHMAN

*Attesting Officer*     *Commissioner of Patents and Trademarks*